United States Patent
Wu

(10) Patent No.: US 11,811,077 B2
(45) Date of Patent: Nov. 7, 2023

(54) POUCH PACKAGED LITHIUM-ION BATTERY WITH TOOTH-SHAPED SEALING EDGE

(71) Applicant: GUANGDONG VDL NEW ENERGY CO., LTD., Dongguan (CN)

(72) Inventor: Fangyu Wu, Dongguan (CN)

(73) Assignee: GUANGDONG VDL NEW ENERGY CO., LTD., Dongguan (CN)

( * ) Notice: Subject to any disclaimer, the term of this patent is extended or adjusted under 35 U.S.C. 154(b) by 222 days.

(21) Appl. No.: 17/366,090

(22) Filed: Jul. 2, 2021

(65) Prior Publication Data

US 2022/0216542 A1    Jul. 7, 2022

(30) Foreign Application Priority Data

Jan. 7, 2021   (CN) .......................... 202120040153.4

(51) Int. Cl.
*H01M 50/105*    (2021.01)
*H01M 50/124*    (2021.01)
(Continued)

(52) U.S. Cl.
CPC ..... *H01M 50/105* (2021.01); *H01M 10/0525* (2013.01); *H01M 10/0587* (2013.01);
(Continued)

(58) Field of Classification Search
CPC ............. H01M 50/181; H01M 50/109; H01M 50/153; H01M 50/105; H01M 50/559;
(Continued)

(56) References Cited

U.S. PATENT DOCUMENTS

2009/0165290 A1    7/2009   Yu et al.
2013/0004817 A1    1/2013   Lee et al.
(Continued)

FOREIGN PATENT DOCUMENTS

CN      109361010 A       2/2019
CN      110197923 A   *   9/2019   ........ H01M 10/0427
(Continued)

OTHER PUBLICATIONS

Machine translation of CN 110197923 A (Year: 2019).*

(Continued)

*Primary Examiner* — James M Erwin

(57) ABSTRACT

A pouch packaged lithium-ion battery with a tooth-shaped sealing edge, including a main body, which includes an aluminum-plastic film arranged with a jelly roll disposed therein. The jelly roll includes a cathode, an anode and a film separating the two. The cathode, the film and the anode are winded and overlaid. A cathode tab and an anode tab are respectively arranged on both sides of the jelly roll. A middle part of the aluminum-plastic film extends toward an outside of the lithium-ion battery to form a sealing edge. The cathode tab and the anode tab extend horizontally and penetrate the sealing edge. A joint between the cathode/anode and the sealing edge is covered with a tab sealant. The sealing edge, the cathode tab and the anode tab are bent to attach to a surface of the main body. The surface of the sealing edge is arranged with tooth-shaped grooves.

20 Claims, 3 Drawing Sheets

(51) Int. Cl.
  *H01M 50/533* (2021.01)
  *H01M 50/184* (2021.01)
  *H01M 10/0525* (2010.01)
  *H01M 10/0587* (2010.01)

(52) U.S. Cl.
  CPC ....... *H01M 50/124* (2021.01); *H01M 50/184* (2021.01); *H01M 50/533* (2021.01)

(58) Field of Classification Search
  CPC ............. H01M 50/186; H01M 50/533; H01M 10/0427
  USPC .......................................................... 429/94
  See application file for complete search history.

(56) References Cited

U.S. PATENT DOCUMENTS

| | | | |
|---|---|---|---|
| 2017/0092925 A1 | 3/2017 | Shiu et al. | |
| 2018/0145284 A1 | 5/2018 | Watanabe et al. | |
| 2022/0320567 A1* | 10/2022 | Lee | ..................... H01M 50/124 |

FOREIGN PATENT DOCUMENTS

| | | | | |
|---|---|---|---|---|
| CN | 110197923 A | | 9/2019 | |
| CN | 110729447 A | | 1/2020 | |
| CN | 110943257 A | | 3/2020 | |
| CN | 210535760 U | | 5/2020 | |
| CN | 112259920 A | | 1/2021 | |
| JP | 2017130415 A | | 7/2017 | |
| KR | 20140117318 A | * | 7/2014 | .......... H01M 50/446 |

OTHER PUBLICATIONS

Machine translation of KR 20140117318 A (Year: 2014).*
India first examination, India Application No. 202214000854, dated Jul. 15, 2022(8 pages).
European search report from European patent office in a counterpart European Patent application No. EP21194842.7 dated Apr. 11, 2022(6 pages).
Singapore partial Search Report, Singapore Application No. 10202114462Y, dated Jan. 18, 2023 (6 pages).

* cited by examiner

US 11,811,077 B2

POUCH PACKAGED LITHIUM-ION BATTERY WITH TOOTH-SHAPED SEALING EDGE

CROSS REFERENCE

The present application claims foreign priority of Chinese Patent Applications No. 202120040153.4, filed on Jan. 7, 2021, in the China National Intellectual Property Administration, the entire contents of which are hereby incorporated by reference.

TECHNICAL FIELD

The present disclosure relates to the field of battery technologies, and in particular to a pouch packaged lithium-ion battery with a tooth-shaped sealing edge.

BACKGROUND

A lithium-ion battery is a secondary battery (rechargeable battery) that works based on the movement of lithium ions between a cathode and an anode. In the process of charging and discharging, $Li^+$ is embedded and de-embedded back and forth between the two electrodes. During charging, $Li^+$ is de-embedded from the cathode and embedded into the anode through electrolyte so that the cathode is in a lithium-rich state. The opposite is true during discharging. The existing lithium-ion battery includes a cathode, an anode, a film and electrolyte. The cathode and the anode are infiltrated in the electrolyte. The lithium ions move between the cathode and the anode with the electrolyte as a medium to realize the charging and discharging of the battery. In order to limit the occurrence of the short circuit between the cathode and the anode through the electrolyte, the cathode and the anode are required to be separated by the film.

However, a cell of the existing lithium-ion battery has a structure with a large volume, resulting in a lower energy density in a unit volume, inconvenience of installation and use, and a crease of the sealing edge after bending.

SUMMARY OF THE DISCLOSURE

According to various embodiments of the present disclosure, a pouch packaged lithium-ion battery with a tooth-shaped sealing edge is provided.

The present disclosure provides a pouch packaged lithium-ion battery with a tooth-shaped sealing edge, including a main body; the main body includes an aluminum-plastic film; wherein the aluminum-plastic film defines a cavity where a jelly roll is arranged therein; the jelly roll includes a cathode, an anode and a film separating the cathode and the anode; the cathode, the film and the anode are winded and overlaid to form a shape of cylinder substantially; a cathode tab is arranged on a side of the jelly roll, and an anode tab is arranged on the other side of the jelly roll; the cathode tab is connected to the cathode electrically, and the anode tab is connected to the anode electrically; a part of the aluminum-plastic film in contact with the cathode tab and the anode tab is bent and extends toward an outside of the lithium-ion battery to form a sealing edge in the middle of the main body; the cathode tab and the anode tab extend horizontally and penetrate the sealing edge; a joint between the cathode tab and the sealing edge is covered with a tab sealant, and a joint between the anode tab and the sealing edge is also covered with a tab sealant; the sealing edge, the cathode tab and the anode tab are bent upward to attach to a surface of the main body; a surface of the sealing edge is arranged with grooves, and the grooves are tooth-shaped in appearance and distributed in an annular array.

In some embodiments, an end of the cathode tab close to the jelly roll is arranged with a first clamping part in an inverted U type.

In some embodiments, the first clamping part is fixed to the cathode by welding.

In some embodiments, an end of the anode tab close to the jelly roll is arranged with a second clamping part in an inverted U type.

In some embodiments, the second clamping part is fixed to the anode by welding.

In some embodiments, the film includes two layers, one layer is arranged on an outer side of the cathode and the other layer is arranged on an outer side of the anode.

In some embodiments, a joint between the sealing edge and the main body is coated with a sealant.

In some embodiments, the cathode tab and the anode tab are symmetrically distributed on both sides of the jelly roll.

In some embodiments, after the cathode tab and the anode tab are bent upward to attach to the surface of the main body, a radial angle between the cathode tab and the main body is 45°-90° and a radial angle between the anode tab and the main body is also 45°-90°.

BRIEF DESCRIPTION OF THE DRAWINGS

To further illustrate technical solutions of the present disclosure, drawings needed for description of the embodiments will be briefly introduced. Obviously, the following drawings are only some embodiments of the present disclosure.

DETAILED DESCRIPTION

Technical solutions of embodiments of the present disclosure will be clearly and completely described as follows in combination with the drawings in the embodiments of the present disclosure.

Embodiments 1

Figure 1:
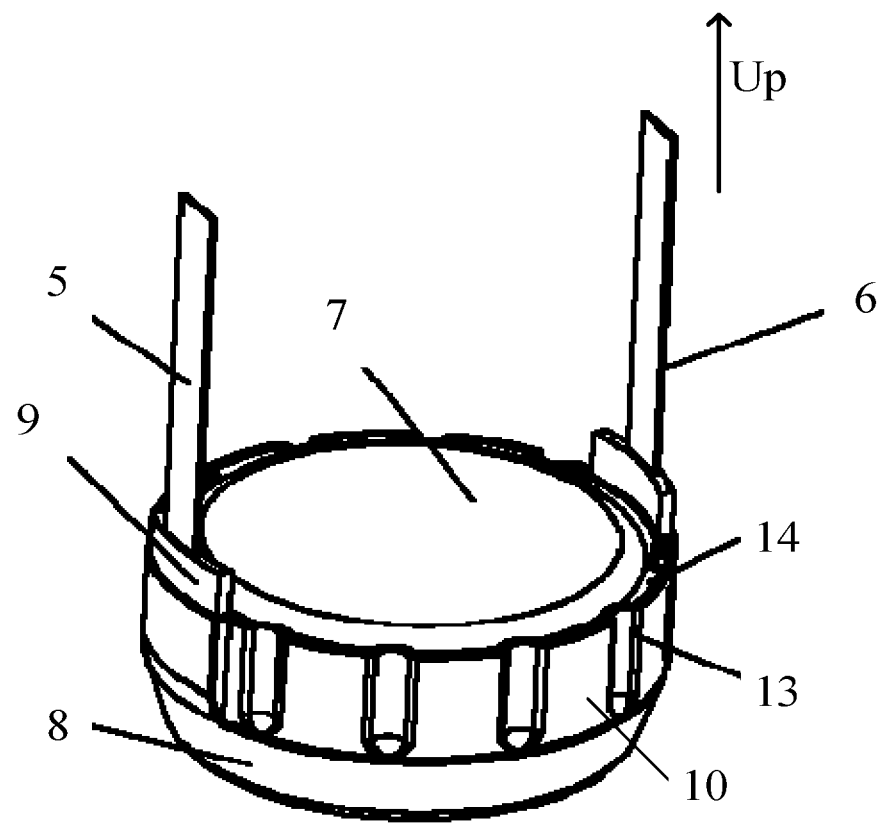
FIG. 1 is a structural perspective schematic view of a pouch packaged lithium-ion battery with a tooth-shaped sealing edge according to an embodiment of the present disclosure.
Figure 2:
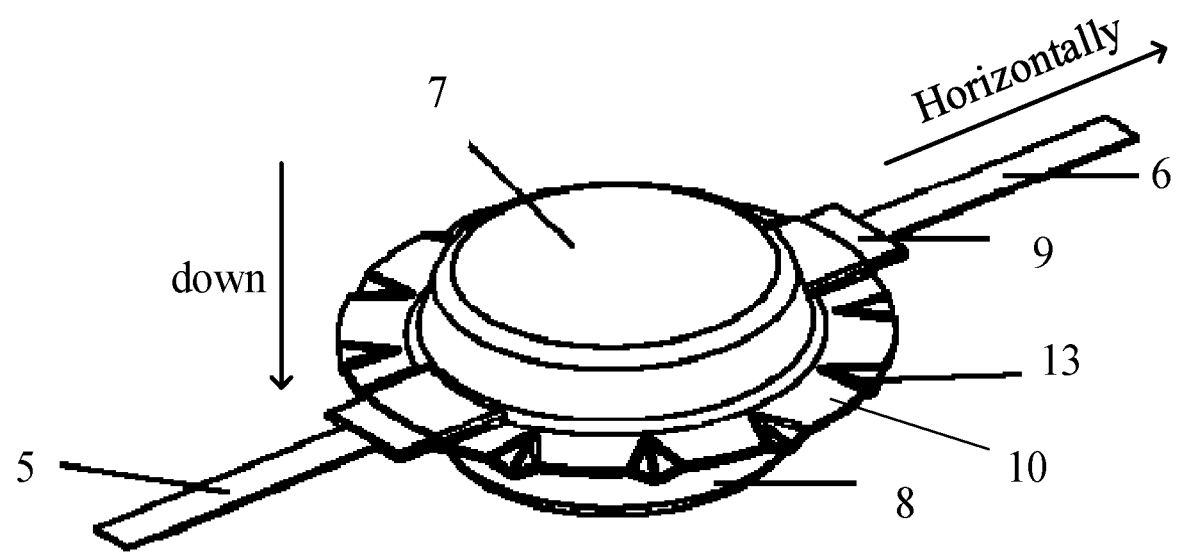
FIG. 2 is a structural perspective schematic view of a pouch packaged lithium-ion battery with a tooth-shaped sealing edge in an unfolded state according to an embodiment of the present disclosure.
Figure 3:
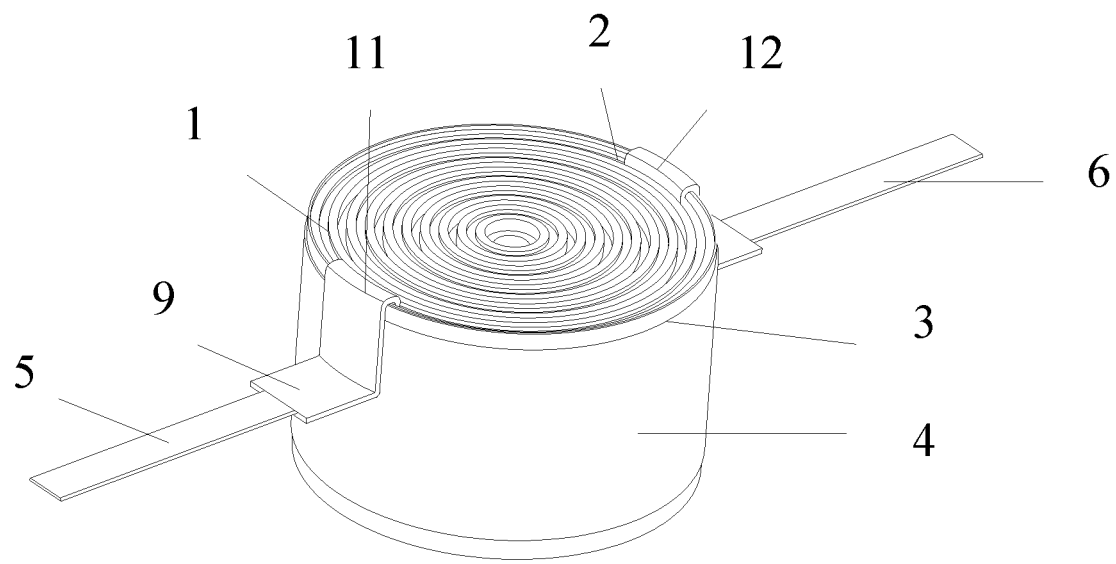
FIG. 3 is a structural schematic view of a jelly roll of a pouch packaged lithium-ion battery with a tooth-shaped sealing edge according to an embodiment of the present disclosure.

As shown in FIGS. 1-3, the embodiment provides a pouch packaged lithium-ion battery with a tooth-shaped sealing edge, including a main body 7. The main body 7 includes an aluminum-plastic film 8 with good insulativity. The aluminum-plastic film 8 defines a cavity where a jelly roll 4 is arranged therein. The jelly roll 4 includes a cathode 1, an anode 2 and a film 3 separating the cathode 1 and the anode 2. The cathode 1, the film 3 and the anode 2 are winded and overlaid to form a shape of cylinder substantially. That is, the jelly roll 4 is formed by winding and overlaying in an order: the cathode 1, the film 3, the anode 2, and the film 3. A cathode tab 5 and an anode tab 6 are respectively arranged on both sides of the jelly roll 4. The cathode tab 5 is connected to the cathode 1 electrically, and the anode tab 6 is connected to the anode 2 electrically. A joint between the cathode tab 5 and the cathode 1 and a joint between the anode tab 6 and the anode 2 may be fixed by welding so that both the cathode 1 and the anode 2 can conduct electricity. A part of the aluminum-plastic film 8 in contact with the cathode tab 5 and the anode tab 6 is bent and extends toward an outside of the lithium-ion battery to form a sealing edge 10 in the middle of the main body 7 (that is, a first bending happens). After covering and wrapping the jelly roll 4 as shown in FIG. 3, the sealing edge 10 and aluminum-plastic film 8 are sealed and molded by hot-pressing. Specifically, as shown in FIG. 2, the cathode tab 5 and the anode tab 6 extend horizontally and penetrate the sealing edge 10. That is, after the cathode tab 5 and the anode tab 6 penetrate the sealing edge 10, the sealing edge 10 may be divided into 2 layers in a thickness direction, and the cathode tab 5 and the anode tab 6 are sandwiched between the 2 layers. A joint between the cathode 5 and the sealing edge 10 is covered with a tab sealant 9. A joint between the anode tab 6 and the sealing edge 10 is also covered with the tab sealant 9. As shown in FIG. 1, the sealing edge 10, the cathode tab 5 and the anode tab 6 may be bent upward to attach to a surface of the main body 7 (that is, a second bending happens). In the process of assembly, the cathode 1 and anode 2 are assembled in the sealing aluminum-plastic film 8 formed by stamping, that is, the jelly roll 4 is assembled in the sealing aluminum-plastic film 8 formed by stamping, and an upper portion and a lower portion of the aluminum plastic film 8 are sealed together by hot pressing. After the jelly roll 4 is injected with electrolyte, activated and sealed again, the sealing edge 10 on an outside of the jelly roll 4 is bent axially, so that the sealing edge 10 may attach to the main body 7 tightly. Moreover, the width of the sealing edge 10 in a diameter direction may be reduced, that is, the diameter of the battery may be reduced by 3-5 mm. The energy density of the battery may be improved. The cathode tab 5 and the anode tab 6 of the battery extend out the main body 7 at a radial angle of 45°-90° to protect the assembly and connection of a printed circuit board (PCB). Since the sealing edge 10 is bent to the main body, the whole battery may be thus assembled to an inside of products of customers, which is convenient and efficient. The surface of the sealing edge 10 may be arranged with grooves 13. The grooves 13 may be tooth-shaped in appearance and distributed in an annular array, so that the sealing edge 10 after bent and attached to the main body 7 is symmetrical, tidy and regular, and occurrences of random distribution of teeth and fold rebounding automatically formed after bending without insection may be limited.

An end of the cathode tab 5 close to the jelly roll 4 may be arranged with a first clamping part 11 in an inverted U type (that is, the first clamping part 11 defines an opening to match an edge of the jelly roll 4). The first clamping part 11 and the cathode tab 5 are formed integrally by stamping.

The first clamping part 11 is fixed to the cathode 1 by welding, so that the joint is strong and can conduct electricity.

An end of the anode tab 6 close to the jelly roll 4 may be arranged with a second clamping part 12 in an inverted U type (that is, the first clamping part 11 defines an opening to match an edge of the jelly roll 4). The second clamping part 12 and the anode tab 6 are formed integrally by stamping.

The second clamping part 12 is fixed to the anode 2 by welding, so that the joint is strong and can conduct electricity.

The film 3 includes two layers. One layer is arranged on an outside of the cathode 1 and the other layer is arranged on an outside of the anode 2, which can at least limit the short circuit since the cathode 1 cannot contact with the anode 2 directly after winding.

A joint between the sealing edge 10 and the main body 7 may be coated with a sealant 14, so that the sealing edge 10 cannot rebound after bending, ensuring a firm structure thereof.

It can be seen that the cathode tab 5 and the anode tab 6 may be symmetrically distributed on both sides of the jelly roll 4.

Embodiments 2

Figure 4:
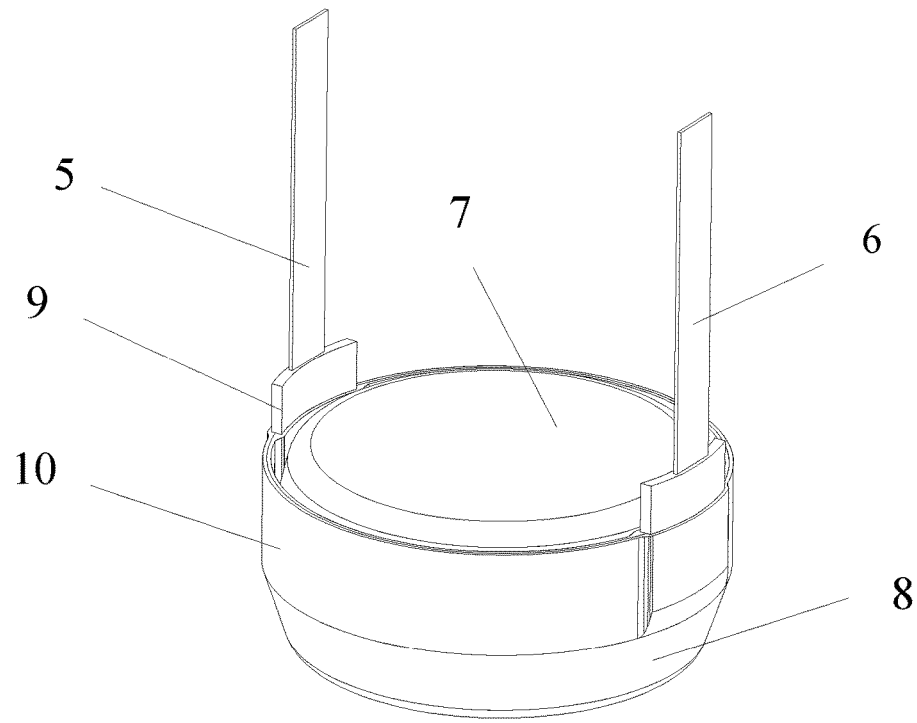
FIG. 4 is a structural perspective schematic view of a pouch packaged lithium-ion battery with a tooth-shaped sealing edge according to another embodiment of the present disclosure.
Figure 5:
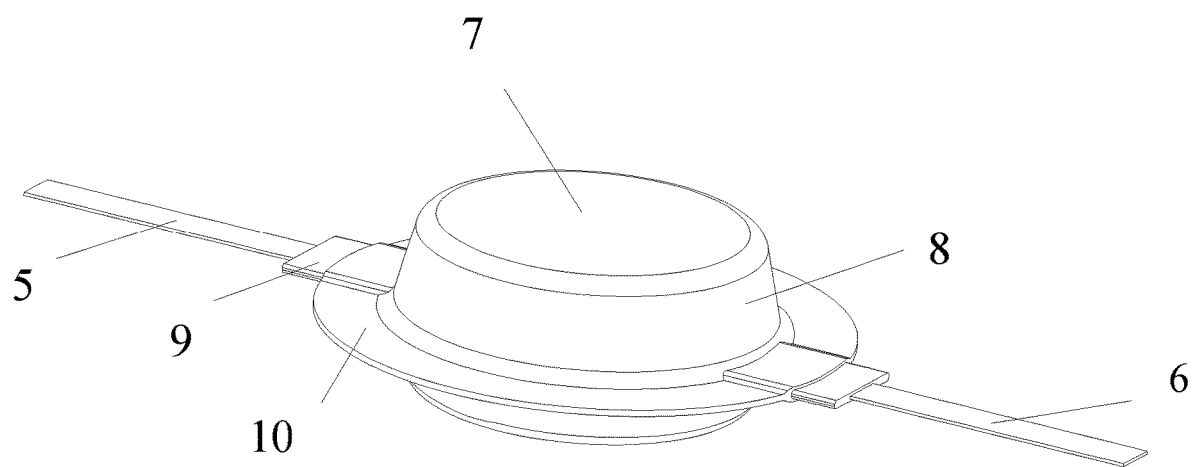
FIG. 5 is a structural perspective schematic view of a pouch packaged lithium-ion battery with a tooth-shaped sealing edge in an unfolded state according to another embodiment of the present disclosure.

As shown in FIGS. 4-5, in order to reduce production cost, the tooth-shaped grooves 13 on the surface of sealing edge 10 in embodiment 1 as shown in FIGS. 1-3 are omitted. The pouch packaged lithium-ion battery with a tooth-shaped sealing edge in the embodiment 2 as shown in FIGS. 4-5 includes: a pouch packaged lithium-ion battery with a jelly roll, including a main body 7. The main body 7 includes an aluminum-plastic film 8 with good insulativity. The aluminum-plastic film 8 defines a cavity where a jelly roll 4 is arranged therein. The jelly roll 4 includes a cathode 1, an anode 2 and a film 3 separating the cathode 1 and the anode 2. The cathode 1, the film 3 and the anode 2 are winded and overlaid to form a shape of cylinder substantially. That is, the jelly roll 4 is formed by winding and overlaying in an order: the cathode 1, the film 3, the anode 2, and the film 3. A cathode tab 5 and an anode tab 6 are respectively arranged on both sides of the jelly roll 4. The cathode tab 5 is connected to the cathode 1 electrically, and the anode tab 6 is connected to the anode 2 electrically. A joint between the cathode tab 5 and the cathode 1 and a joint between the anode tab 6 and the anode 2 may be fixed by welding so that both the cathode 1 and the anode 2 can conduct electricity. A part of the aluminum-plastic film 8 in contact with the cathode tab 5 and the anode tab 6 is bent and extends toward an outside of the lithium-ion battery to form a sealing edge 10 in the middle of the main body 7 (that is, a first bending happens). After covering and wrapping the jelly roll 4, the sealing edge 10 and aluminum-plastic film 8 are sealed and molded by hot-pressing. Specifically, as shown in FIG. 5, the cathode tab 5 and the anode tab 6 extend horizontally and penetrate the sealing edge 10. A joint between the cathode 5 and the sealing edge 10 is covered with a tab sealant 9. A joint between the anode tab 6 and the sealing edge 10 is also covered with the tab sealant 9. As shown in FIG. 4, the sealing edge 10, the cathode tab 5 and the anode tab 6 may be bent upward to attach to a surface of the main body 7 (that is, a second bending happens). In the process of assembly, the cathode 1 and anode 2 are assembled in the sealing aluminum-plastic film 8 formed by stamping, that is, the jelly roll 4 is assembled in the sealing aluminum-plastic film 8 formed by stamping, and an upper portion and a lower portion of the aluminum plastic film 8 are sealed together by hot pressing. After the jelly roll 4 is injected with electrolyte, activated and sealed again, the sealing edge 10 on an outside of the jelly roll 4 is bent axially, so that the sealing edge 10 may attach to the main body 7 tightly. Moreover, the width of the sealing edge 10 in a diameter direction may be reduced, that is, the diameter of the battery may be reduced by 3-5 mm. The energy density of the battery may be improved. The cathode tab 5 and the anode tab 6 of the battery extend out the main body 7 at a radial angle of 45°-90° to protect the assembly and connection of the PCB. Since the sealing edge 10 is bent to the main body, the whole battery may be thus assembled to an inside of products of customers, which is convenient and efficient.

In conclusion, by virtue of the technical solutions above, the present disclosure may achieve beneficial effects as followed. The cathode, the film and the anode are winded and overlaid to form a shape of cylinder substantially. That is, the jelly roll is formed by winding and overlaying in an order: the cathode, the film, the anode, and the film, therefore the film between the cathode and the anode can at least limit the occurrence of a short. The integral structure of the jelly roll is compact after wending, thereby improving the energy density of the battery. The cathode tab and the anode tab extend horizontally and penetrate the sealing edge. A joint between the cathode and the sealing edge is covered with a tab sealant, and a joint between the anode tab and the sealing edge is also covered with the tab sealant. Since the sealing edge, the cathode tab and the anode tab are bent upward to attach to a surface of the main body, the width of the sealing edge in a diameter direction may be thus reduced. The cathode tab and the anode tab are convenient to be connected to a circuit after extending upward, so that the whole battery may be thus conveniently assembled to an inside of products of customers. The surface of the sealing edge is arranged with grooves, and the grooves are tooth-shaped in appearance and distributed in an annular array, therefore a crease is incapable to be generate and the sealing edge after bent is regular and beautiful.

The above embodiments are some optimized implantations of the present disclosure. It should be noted that, those skilled in the art can still make any improvements and modifications without departing from the idea of the present disclosure, and all these belong to the scope of the present disclosure.

What is claimed is:

1. A pouch packaged lithium-ion battery with a tooth-shaped sealing edge, comprising:
a main body, comprising an aluminum-plastic film; wherein the aluminum-plastic film defines a cavity where a jelly roll is arranged therein; the jelly roll comprises a cathode, an anode and a film separating the cathode and the anode; the cathode, the film and the anode are winded and overlaid to form a shape of a cylinder; a cathode tab is arranged on a side of the jelly roll, and an anode tab is arranged on the other side of the jelly roll; the cathode tab is connected to the cathode electrically, and the anode tab is connected to the anode electrically; a part of the aluminum-plastic film in contact with the cathode tab and the anode tab is bent and extends toward an outside of the lithium-ion battery to form a sealing edge in the middle of the main body; the cathode tab and the anode tab extend horizontally and penetrate the sealing edge; a joint between the cathode tab and the sealing edge is covered with a tab sealant, and a joint between the anode tab and the sealing edge is also covered with a tab sealant; the sealing edge, the cathode tab and the anode tab are bent upward to attach to a surface of the main body; a surface of the sealing edge is arranged with grooves, and the grooves are tooth-shaped in appearance and distributed in an annular array; and an end of the cathode tab close to the jelly roll is arranged with a first clamping part in an inverted U type, and the first clamping part defines an opening to match an edge of the jelly roll.

2. The pouch packaged lithium-ion battery with a tooth-shaped sealing edge according to claim 1, wherein the first clamping part is fixed to the cathode by welding.

3. The pouch packaged lithium-ion battery with a tooth-shaped sealing edge according to claim 1, wherein an end of the anode tab close to the jelly roll is arranged with a second clamping part in an inverted U type.

4. The pouch packaged lithium-ion battery with a tooth-shaped sealing edge according to claim 3, wherein the second clamping part is fixed to the anode by welding.

5. The pouch packaged lithium-ion battery with a tooth-shaped sealing edge according to claim 1, wherein the film comprises two layers, one layer is arranged on an outer side of the cathode and the other layer is arranged on an outer side of the anode.

6. The pouch packaged lithium-ion battery with a tooth-shaped sealing edge according to claim 1, wherein a joint between the sealing edge and the main body is coated with a sealant.

7. The pouch packaged lithium-ion battery with a tooth-shaped sealing edge according to claim 1, wherein the cathode tab and the anode tab are symmetrically distributed on both sides of the jelly roll.

8. The pouch packaged lithium-ion battery with a tooth-shaped sealing edge according to claim 1, wherein after the cathode tab and the anode tab are bent upward to attach to the surface of the main body, a radial angle between the cathode tab and the main body is 45°-90° and a radial angle between the anode tab and the main body is also 45°-90°.

9. The pouch packaged lithium-ion battery with a tooth-shaped sealing edge according to claim 1, wherein the first clamping part and the cathode tab are formed integrally by stamping.

10. A pouch packaged lithium-ion battery with a tooth-shaped sealing edge, comprising:
a main body, comprising an aluminum-plastic film; wherein the aluminum-plastic film defines a cavity where a jelly roll is arranged therein; the jelly roll comprises a cathode, an anode and a film separating the cathode and the anode; the cathode, the film and the anode are winded and overlaid; a cathode tab is arranged on a side of the jelly roll, and an anode tab is arranged on the other side of the jelly roll; the cathode tab is connected to the cathode electrically, and the anode tab is connected to the anode electrically; a part of the aluminum-plastic film in contact with the cathode tab and the anode tab is bent and extends toward an outside of the lithium-ion battery to form a sealing edge in the middle of the main body; the cathode tab and the anode tab extend horizontally and penetrate the sealing edge; a joint between the cathode tab and the sealing edge is covered with a tab sealant, and a joint between the anode tab and the sealing edge is also covered with a tab sealant; the sealing edge, the cathode tab and the anode tab are bent upward to attach to a surface of the main body; a surface of the sealing edge is arranged with grooves, and the grooves are tooth-shaped in appearance and distributed in an annular array; and an end of the cathode tab close to the jelly roll is arranged with a first clamping part in an inverted U type, and the first clamping part defines an opening to match an edge of the jelly roll.

11. The pouch packaged lithium-ion battery with a tooth-shaped sealing edge according to claim 10, wherein the first clamping part is fixed to the cathode by welding.

12. The pouch packaged lithium-ion battery with a tooth-shaped sealing edge according to claim 10, wherein an end of the anode tab close to the jelly roll is arranged with a second clamping part in an inverted U type.

13. The pouch packaged lithium-ion battery with a tooth-shaped sealing edge according to claim 12, wherein the second clamping part is fixed to the anode by welding.

14. The pouch packaged lithium-ion battery with a tooth-shaped sealing edge according to claim 10, wherein the film comprises two layers, one layer is arranged on an outer side of the cathode and the other layer is arranged on an outer side of the anode.

15. The pouch packaged lithium-ion battery with a tooth-shaped sealing edge according to claim 10, wherein the cathode tab and the anode tab are symmetrically distributed on both sides of the jelly roll.

16. The pouch packaged lithium-ion battery with a tooth-shaped sealing edge according to claim 10, wherein after the cathode tab and the anode tab are bent upward to attach to the surface of the main body, a radial angle between the cathode tab and the main body is 45°-90° and a radial angle between the anode tab and the main body is also 45°-90°.

17. The pouch packaged lithium-ion battery with a tooth-shaped sealing edge according to claim 10, wherein the first clamping part and the cathode tab are formed integrally by stamping.

18. A pouch packaged lithium-ion battery with a tooth-shaped sealing edge, comprising:

a main body, comprising an aluminum-plastic film; wherein the aluminum-plastic film defines a cavity where a jelly roll is arranged therein; the jelly roll comprises a cathode, an anode and a film separating the cathode and the anode; the cathode, the film and the anode are winded and overlaid to form a shape of a cylinder; a cathode tab is arranged on a side of the jelly roll, and an anode tab is arranged on the other side of the jelly roll; the cathode tab is connected to the cathode electrically, and the anode tab is connected to the anode electrically; a part of the aluminum-plastic film in contact with the cathode tab and the anode tab is bent and extends toward an outside of the lithium-ion battery to form a sealing edge in the middle of the main body; the cathode tab and the anode tab extend horizontally and penetrate the sealing edge; a joint between the cathode tab and the sealing edge is covered with a tab sealant, and a joint between the anode tab and the sealing edge is also covered with a tab sealant; the sealing edge, the cathode tab and the anode tab are bent upward to attach to a surface of the main body; and an end of the cathode tab close to the jelly roll is arranged with a first clamping part in an inverted U type, and the first clamping part defines an opening to match an edge of the jelly roll.

19. The pouch packaged lithium-ion battery with a tooth-shaped sealing edge according to claim 18, wherein an end of the anode tab close to the jelly roll is arranged with a second clamping part in an inverted U type.

20. The pouch packaged lithium-ion battery with a tooth-shaped sealing edge according to claim 18, wherein the first clamping part and the cathode tab are formed integrally by stamping.

\* \* \* \* \*